United States Patent
Nelson et al.

(10) Patent No.: US 6,568,278 B2
(45) Date of Patent: May 27, 2003

(54) PROCESS CONNECTION FOR IN-LINE PRESSURE TRANSMITTER

(75) Inventors: Scott D. Nelson, Plymouth, MN (US); Mark C. Fandrey, Eden Prairie, MN (US); Paul C. Sundet, Plymouth, MN (US); William E. Petrich, Golden Valley, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 10/047,921

(22) Filed: Oct. 23, 2001

(65) Prior Publication Data

US 2002/0178822 A1 Dec. 5, 2002

Related U.S. Application Data

(60) Provisional application No. 60/242,940, filed on Oct. 24, 2000.

(51) Int. Cl.⁷ .................................................. G01L 7/00
(52) U.S. Cl. ............................................................ 73/756
(58) Field of Search ............................ 73/706, 715, 716, 73/717, 722, 723, 756

(56) References Cited

U.S. PATENT DOCUMENTS

| | | | |
|---|---|---|---|
| 4,722,228 A | 2/1988 | Awa et al. | 73/706 |
| 4,993,754 A | 2/1991 | Templin, Jr. | 285/189 |
| 5,248,167 A | 9/1993 | Petrich et al. | 285/23 |
| 5,731,522 A | 3/1998 | Sittler | 73/708 |
| 6,038,961 A | 3/2000 | Filippi et al. | 92/98 |

FOREIGN PATENT DOCUMENTS

| | | |
|---|---|---|
| DE | 39 20 207 A1 | 1/1991 |
| EP | 0 701 113 A2 | 3/1996 |
| WO | WO 94/05988 | 3/1994 |

OTHER PUBLICATIONS

Fisher–Rosemount, "Managing the Process Better," *Comprehensive Product Catalog,* 1999 English Edition; Pressure—24; 25; 26; 27; 28; and 30 for Model 3051 (Digital Pressure Transmitter) consisting of 6 pages. No month.

Fisher–Rosemount, "Managing the Process Better," *Comprehensive Product Catalog,* 1999 English Edition; Pressure—82; 84; 86; and 101 for Model 305/306 (Manifold Solutions) consisting of 4 pages. No month.

Fisher–Rosemount, "Managing the Process Better," *Comprehensive Product Catalog,* 1999 English Edition; Pressure—121 for Model 3051 (CD0 Pressure Transmitter) consisting of 1 page. No month.

Fisher–Rosemount, "Managing the Process Better," *Comprehensive Product Catalog,* 1999 English Edition; Pressure—176 for Model 1151 (Alphaline Pressure Transmitter) consisting of 1 page. No month.

Fisher–Rosemount, "Managing the Process Better," *Comprehensive Product Catalog,* 1999 English Edition; Pressure—236; 237 and 238 for Worldwide Model 1199 (Diaphragm Seal Systems) consisting of 3 pages. No mo.

Fisher–Rosemount, "Managing the Process Better," *Comprehensive Product Catalog,* 1999 English Edition; Pressure—239 for Worldwide (Guide to the Selection of Sanitary Seals) consisting of 1 page. No mo.

*Primary Examiner*—William Oen
(74) *Attorney, Agent, or Firm*—Westman, Champlin & Kelly, P.A.

(57) ABSTRACT

An in-line pressure transmitter for sensing an absolute or gage process pressure of a process fluid includes an in-line process coupling. The coupling has a mounting member which includes a substantially flat mounting face and a bore generally aligned with an isolation diaphragm assembly. The member is configured to mount to a flat process coupling.

12 Claims, 4 Drawing Sheets

PROCESS CONNECTION FOR IN-LINE PRESSURE TRANSMITTER

The present application is based on and claims the benefit of U.S. provisional patent application Ser. No. 60/242,940, filed Oct. 24, 2000, the content of which is hereby incorporated by reference in its entirety.

BACKGROUND OF THE INVENTION

The present invention relates to pressure transmitters of the type used to measure pressure of a process fluid. More specifically, the invention relates to a coupling used to connect the pressure transmitter to a process fluid.

Transmitters are used to monitor the condition of industrial processes by measuring process variables such as pressure, temperature and flow. Pressure transmitters measure the pressure of a process fluid (gas or liquid) and transmit data related to the measured pressure to a remote control room over a process control loop.

There are two general types of pressure transmitters. Differential pressure transmitters measure the pressure differential between two process pressures and require two connections to the process fluid. The second type of pressure transmitter measures an absolute (relative or vacuum) or gage (relative to ambient pressure) pressure of the process fluid and requires a single coupling to the process fluid.

Some absolute or gage pressure transmitters have an in-line configuration in which a single pressure sensor, isolation diaphragm and process coupling are placed in an in-line configuration. Traditionally, in-line gage and absolute pressure transmitters have coupled to the process fluid using a threaded coupling. The threaded coupling of the transmitter is screwed onto a threaded pipe having a standardized configuration. The pipe couples to the process, for example, to process piping.

The threaded connections used to couple absolute or pressure gage pressure transmitters to process equipment can be a source of process leaks.

SUMMARY OF THE INVENTION

An in-line pressure transmitter for sensing an absolute or gage process pressure of a process fluid couples to the process using a non-threaded connection. The transmitter includes a pressure sensor which senses the process pressure and transmitter circuitry which provides an output related to the sensed process pressure. A single isolation diaphragm assembly isolates the process fluid from the pressure sensor. A transmitter housing contains the pressure sensor, transmitter circuitry and isolation diaphragm assembly. An in-line process coupling is welded to the housing having a mounting member which includes a substantially flat mounting face and a bore generally aligned with the isolation diaphragm assembly.

DETAILED DESCRIPTION OF THE PREFERRED EMBODIMENTS

Figure 1B:
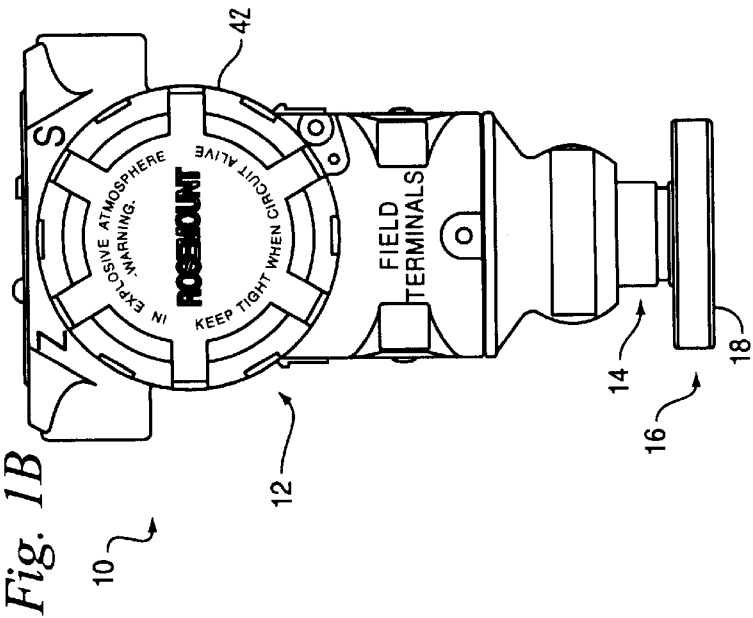
FIG. 1B is a side plan view of the pressure transmitter of FIG. 1A rotated 90°.
Figure 1A:
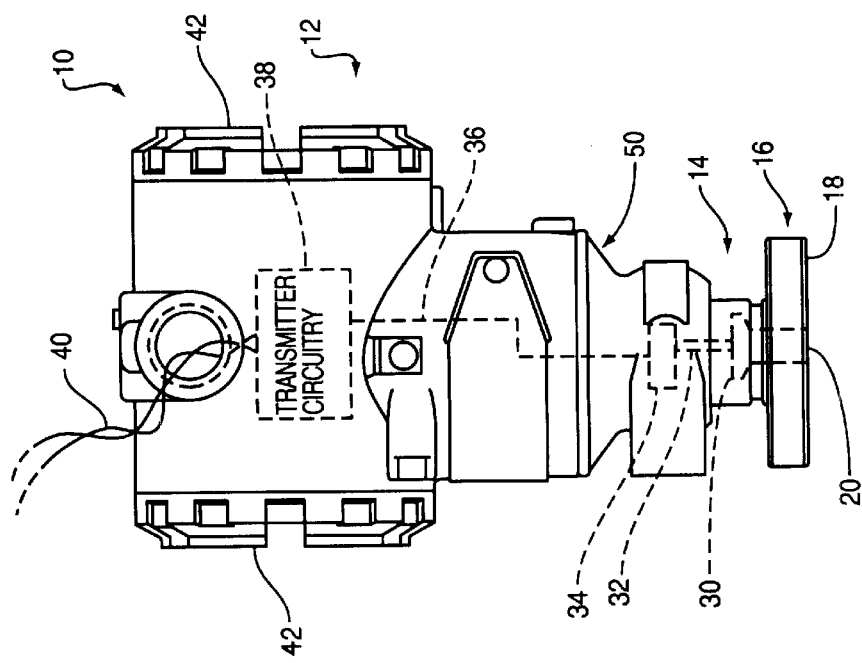
FIG. 1A is a side plan view of a pressure transmitter including an in-line process coupling of the invention.

FIG. 1A is a side plan view of an in-line pressure transmitter 10 which includes a transmitter housing 12 coupled to an in-line process coupling 14. In-line process coupling 14 includes a mounting member 16 having a mounting face 18 which is configured to seal to a process coupling (not shown in FIG. 1A) and thereby couple the pressure transmitter 10 to a process fluid.

Mounting member 16 includes a bore 20 which extends from mounting face 18 to an isolation diaphragm assembly 30 which carries process fluid from mounting face 18 to isolation diaphragm assembly 30. (See dashed lines in FIG. 7A). Isolation diaphragm assembly 30 includes an isolation diaphragm which isolates the process fluid from isolation fluid carried in isolation capillary 32. Isolation capillary 32 couples to a pressure sensor 34. Sensor 34 is configured to measure an absolute pressure (relative to vacuum) or a gage pressure (relative to atmospheric pressure) and provide an electrical output 36 to transmitter circuitry 38. Preferably, transmitter circuitry 38 is configured to provide an output, for example on two-wire process control loop 40 which is indicative of the sensed pressure. Process control loop 30 can be in accordance with known standards such as HART, Fieldbus, etc. In one embodiment, transmitter housing 12 is sealed with end caps 42.

In-line process coupling 14 is fixedly coupled to transmitter housing 12 with, for example, a coupling 50. In one embodiment, coupling 50 comprises a weld.

Figure 2:
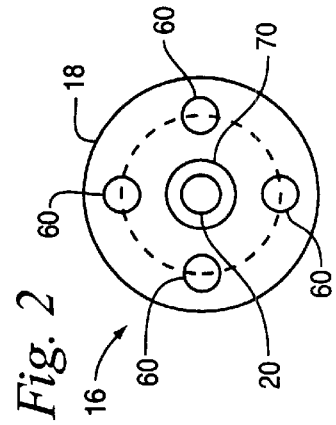
FIG. 2 is a bottom plan view of a mounting member of the pressure transmitter.

FIG. 1B is a side plan view of pressure transmitter 10 rotated 90° about its axis relative to the orientation shown in FIG. 1A. FIG. 2 is a bottom plan view of mounting member 16 and shows four bolt holes 60 spaced equal distantly from bore 20 and extending generally parallel with bore 20. In one aspect, mounting member 16 includes at least two bolt holes spaced an equal distant and oppositely sides from bore 20. In one specific configuration, each pair of opposed bolt holes 60 are spaced 1.626 inches apart and have a diameter of 7/16" 20 (threads per inch) The bolt holes 60 can be threaded, such that they do not require an opposed bolt, or unthreaded. In this embodiment, bore 20 has a diameter of 0.375" and is surrounded by a recess 70 having a diameter of 0.734". Recess 70 is configured to receive a seal with face 106 (not shown in FIG. 2).

Mounting member 16 preferably has a thickness sufficient to withstand substantial process pressures and support the weight of transmitter 10. Similarly, the in-line process coupling 14 and its coupling 50 to transmitter housing 12 preferably are of sufficient strength to support the weight of transmitter 10.

Figure 3:
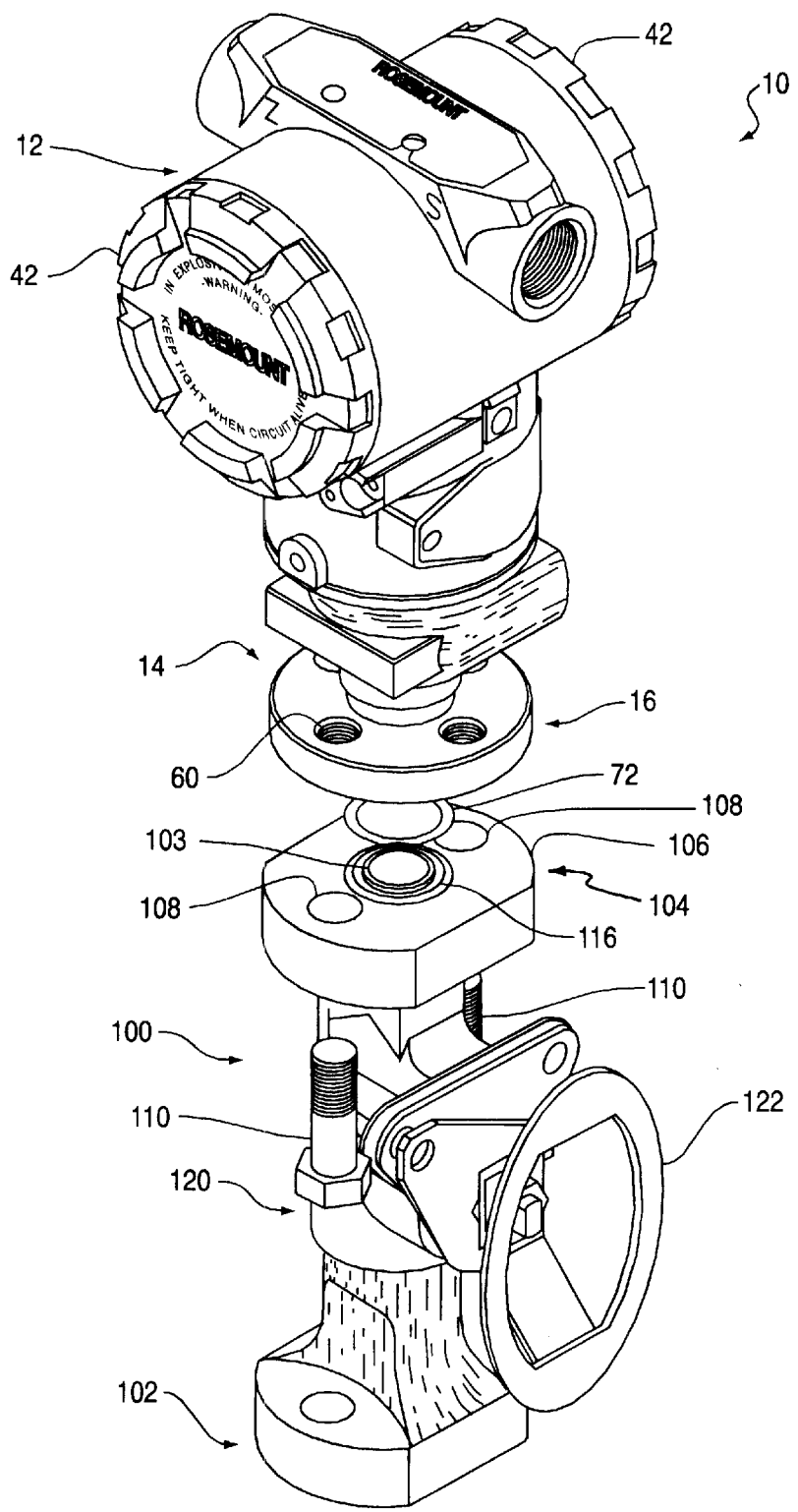
FIG. 3 is an exploded perspective view showing the pressure transmitter and a valved manifold.

FIG. 3 is an exploded perspective view of pressure transmitter 10 and valved manifold 100. Valved manifold 100 includes an inlet member 102 which is configured to couple to a process vessel, such as process piping. Manifold 100 is a standard manifold coupling used to couple to, for example, a co-planar™ differential pressure sensor. A bore 103 extends through manifold 100 through inlet member 102 to an outlet member 104. Outlet member 104 includes an outlet face 106 configured to mate with mounting face 18 of mounting member 16. Bolt holes 108 extend through outlet face 106 and they are configured to receive bolts 110. Bolt holes 108 are configured to align with opposed pairs of bolt holes 60 in mounting member 16. In the embodiment illustrated in FIG. 3, bolts 110 are threaded and configured to be threadably received in bolt holes 60.

In a preferred embodiment as illustrated in FIG. 3, transmitter 10 can be rotated 90° such that the second pair of opposed bolt holes 60 are aligned with bolt holes 108. Outlet face 106 includes an annular recess 116 which extends around bore 103 and is configured to align with recess 70 shown in FIG. 2 of mounting face 18. The seal 72 is configured to fit into recess 116 to thereby provide a seal around bore 103 and bore 20.

Valved manifold 100 includes a blocking valve 120 coupled to valve handle 122 which is configured to selectively block bore 103 and thereby block process fluid. When the process fluid is blocked, the pressure transmitter 16 can be removed from the valved manifold 100. As discussed below, block and/or vent valves can be provided in in-line coupling 14.

Figure 4C:
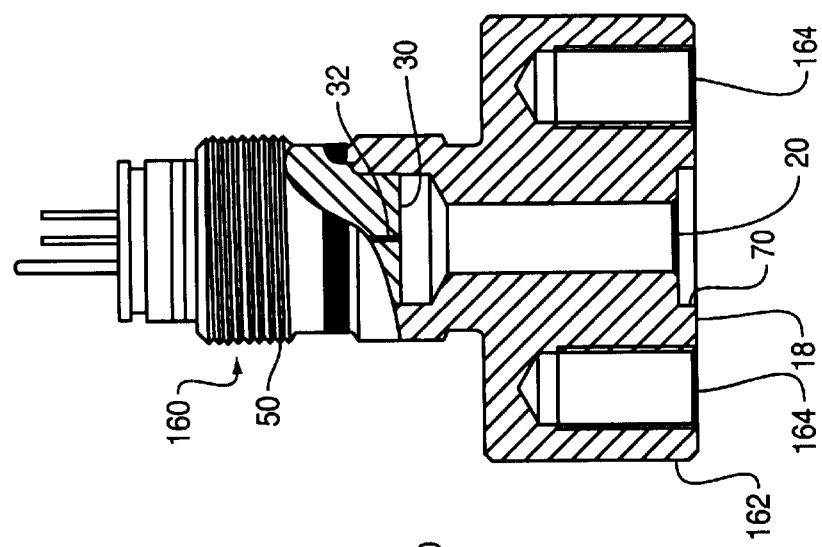
FIG. 4C is a side partial cutaway view of in-line process coupling including threaded bolt holes.
Figure 4B:
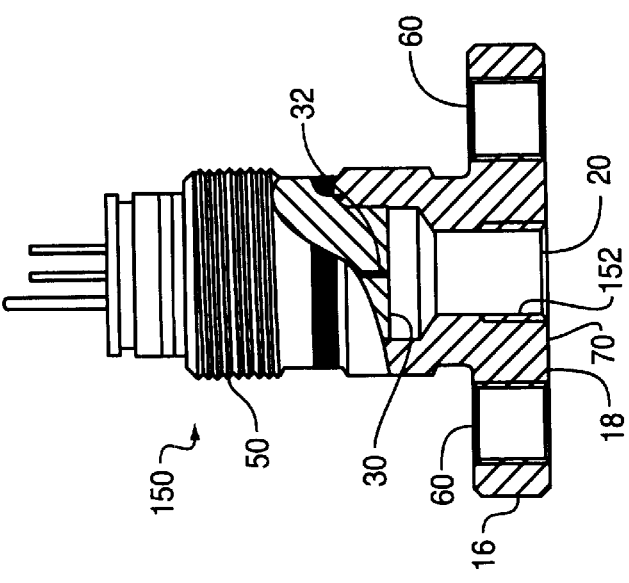
FIG. 4B is a side partial cutaway view of in-line process coupling in which a bore of the coupling has an interior threading.
Figure 4A:
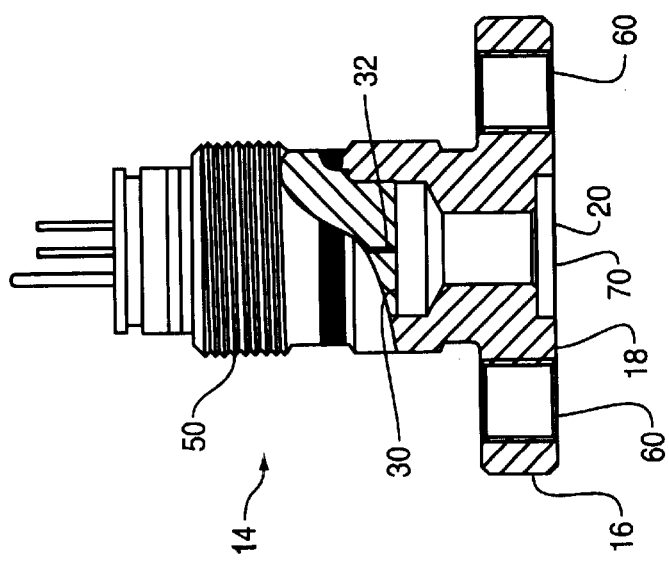
FIG. 4A is a side partial cutaway view of an in-line coupling in accordance with one embodiment of the invention.

FIG. 4A is a side partial cutaway view of in-line coupling 16. FIG. 4A more clearly illustrates the position of isolation diaphragm 30 and capillary 32. FIG. 4B is a partial cutaway view of an in-line coupling 150 in accordance with another embodiment. In the embodiment of FIG. 4B, bore 20 includes threads 152 such that it may be optionally coupled to a prior art threaded coupling. FIG. 4C shows another example embodiment of an in-line coupling 160 in which mounting member 162 is thicker than mounting member 16. Bolt holes 164 are threaded and configured to threadably receive bolts. The bolt holes 164 do not extend all the way through member 152.

Figure 5:
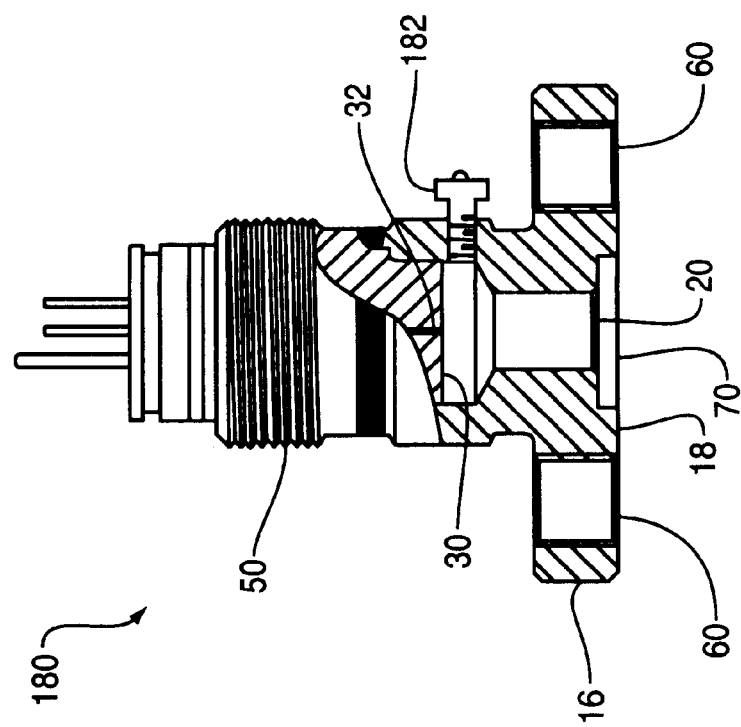
FIG. 5 is a side partial cutaway view of showing a vent valve.

Pursuant to another embodiment, FIG. 5 is a side partial cutaway view of an in-line coupling 180 which includes a bleed or vent valve 182 which extends into bore 20. Bleed valve 182 is used to bleed off process fluid, for example, to flush air from the process coupling.

Figure 6:
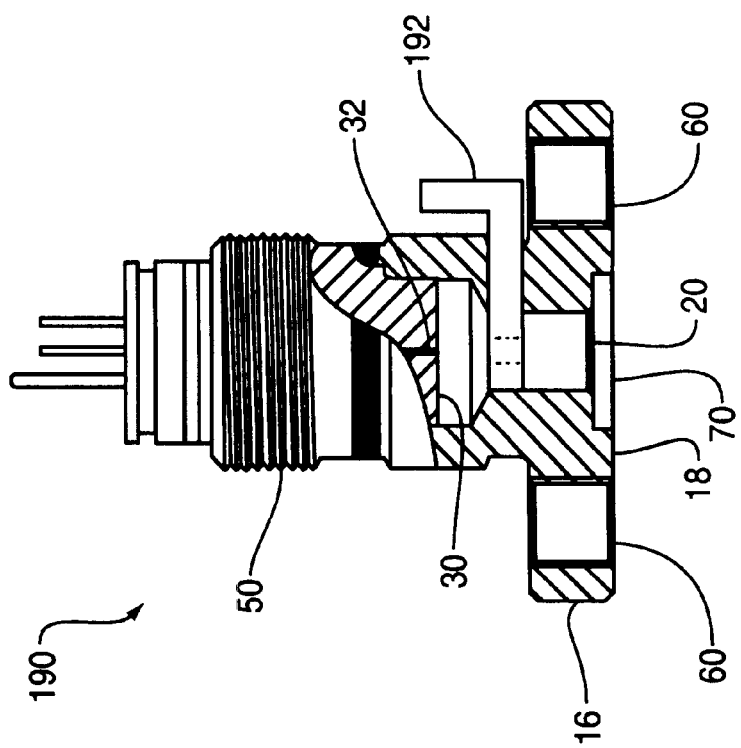
FIG. 6 is a side partial cutaway view showing a blocked valve.

FIG. 6 is a side partial cutaway view of an in-line process coupling 190 in accordance with another example embodiment. In FIG. 6, coupling 190 includes a block valve 192 which is configured to selectively block bore 20. This prevents pressure from being applied to diaphragm 30. Note that valves 182 and 192 can both be used in the same in-line process coupling such that the in-line process coupling has both a block and a bleed valve.

Although the present invention has been described with reference to preferred embodiments, workers skilled in the art will recognize that changes may be made in form and detail without departing from the spirit and scope of the invention.

What is claimed is:

1. An in-line pressure transmitter for sensing an absolute or gage process pressure of a process fluid, comprising:

a pressure sensor configured to sense the process pressure;

transmitter circuitry coupled to the pressure sensor configured to provide an output related to the sensed process pressure;

a single isolation diaphragm assembly configured to isolate the process fluid from the pressure sensor;

a transmitter housing containing the pressure sensor, transmitter circuitry and isolation diaphragm assembly; and an in-line process coupling integral with the housing having a mounting member which includes a substantially flat mounting face and a bore generally aligned with the isolation diaphragm assembly, the mounting face configured to receive a manifold and seal against the manifold, the mounting member including at least two bolt holes extending therethrough which extend generally parallel with the bore.

2. The in-line pressure transmitter of claim 1 wherein the in-line process coupling is welded to the housing.

3. The in-line pressure transmitter of claim 1 wherein the bolt holes are spaced a substantially equal distance from the bore.

4. The in-line pressure transmitter of claim 1 wherein centers at the bolt holes are spaced about 1.626 inches apart.

5. The in-line pressure transmitter of claim 1 wherein the bore is threaded and configured to receive a threaded process connection.

6. The in-line pressure transmitter of claim 1 wherein the in-line process coupling includes a block valve to block the bore.

7. The in-line pressure transmitter of claim 1 wherein the in-line process coupling includes a vent valve configured to vent the bore.

8. The in-line pressure transmitter of claim 1 wherein the mounting member includes four bolt holes spaced substantially equal distance from the bore.

9. The in-line pressure transmitter of claim 1 wherein the transmitter circuitry is configured to couple to a two-wire process control loop.

10. The in-line pressure transmitter of claim 1 wherein the pressure sensor is configured to measure gage pressure.

11. The in-line pressure transmitter of claim 1 wherein the pressure sensor is configured to measure absolute pressure.

12. The in-line pressure transmitter of claim 1 including a depression in the mounting face which extends around the bore.

* * * * *